(12) United States Patent
Renton et al.

(10) Patent No.: US 6,505,384 B1
(45) Date of Patent: Jan. 14, 2003

(54) CLEAT

(76) Inventors: Julian Elwyn Renton, Frankleigh Farm, Bath Road, Bradford on Avon, Wiltshire (GB), BA15 2PF; Peter Nott, 4 Bellevedere, Landsdown, Bath (GB), BA15 5ED ( * ) Notice: Subject to any disclaimer, the term of this patent is extended or adjusted under 35 U.S.C. 154(b) by 0 days.

(21) Appl. No.: 09/674,096
(22) PCT Filed: Apr. 22, 1999
(86) PCT No.: PCT/GB99/01252
§ 371 (c)(1), (2), (4) Date: Dec. 12, 2000
(87) PCT Pub. No.: WO99/56035
PCT Pub. Date: Nov. 4, 1999

(30) Foreign Application Priority Data

Apr. 28, 1998 (GB) .............................................. 9808879

(51) Int. Cl.⁷ ................................................ F16G 11/00
(52) U.S. Cl. ................................ 24/134 R; 24/132 WL; 24/136 R; 114/218
(58) Field of Search .................... 24/134 R, 132 R, 24/132 WL, 136 R, 68 CD, 265 CD; 188/65.1, 65.2; 114/218; 182/5

(56) References Cited

U.S. PATENT DOCUMENTS

| | | | |
|---|---|---|---|
| 3,017,678 A | | 1/1962 | Christensen |
| 3,765,061 A | * | 10/1973 | Nash ........................... 114/210 |
| 3,967,349 A | * | 7/1976 | Christensen .............. 24/132 R |
| 4,083,438 A | * | 4/1978 | Handa ........................ 188/65.3 |
| 4,253,218 A | * | 3/1981 | Gibbs ............................... 182/5 |
| 4,465,011 A | * | 8/1984 | Merry ........................ 114/199 |
| 4,528,727 A | * | 7/1985 | Adomeit .................... 24/132 R |
| 4,830,340 A | * | 5/1989 | Knitig ............................. 182/5 |
| 5,156,240 A | * | 10/1992 | Ostrobrod .................... 182/193 |
| 5,544,723 A | * | 8/1996 | Gettemy ..................... 188/65.1 |
| 5,548,873 A | * | 8/1996 | Macias ..................... 24/115 G |
| 5,931,112 A | * | 8/1999 | Lacan ......................... 114/218 |

FOREIGN PATENT DOCUMENTS

FR    2 753 169    3/1998

* cited by examiner

Primary Examiner—Robert J. Sandy
Assistant Examiner—Andre' L. Jackson
(74) Attorney, Agent, or Firm—Wenderoth, Lind & Ponack, L.L.P.

(57) ABSTRACT

An apparatus for gripping a flexible elongated member includes a housing having a base, a lever pivotally connected to the housing, and a gripping component having a gripping member. The lever is pivotally connected to the housing, and the gripping component is mounted so as to be movable relative to the housing. The gripping component, housing, and lever are arranged such that manipulation of the elongated member so as to contact the lever will cause the lever and gripping component to move relative to each other, thereby gripping or releasing the elongated member.

17 Claims, 8 Drawing Sheets

CLEAT

BACKGROUND OF THE INVENTION

This invention relates to a device for gripping and releasing rope and/or tape. In particular, this invention provides a mechanism which, when used in conjunction with a substantially conventional means of gripping rope and/or tape, enables loaded gripped rope and/or tape to be released easily and to be gripped easily as determined by controlled movement of the unloaded part of the rope close to or at a distance from the device. In particular, the effort required to release loaded rope is relatively small compared to the applied working load on the rope.

Conventional devices for gripping and releasing rope provide one or more clamps that act on the rope such that the clamping force on the rope is directly related to the applied load on the rope. For example, many conventional cleats use cams positioned on either side of the rope with the axis of rotation for each cam parallel to each other and perpendicular to the line or length of the rope. The rotation of each cam urges the cam forms to apply a gripping load to the rope, the gripping load being directly proportional to the applied load on the rope. The greater the applied load on the rope, the closer the cam surfaces move towards each other to apply a greater gripping force on the rope. This gripping force, together with the roughness and/or toothed form of the cam surfaces which contact the rope surface, provide the friction needed to overcome the applied load on the rope. Alternatively, some conventional cleats consist of one cam positioned on one side of the rope such that the cam rotates to push the rope against a relatively static surface on the other side of the rope. This surface is usually roughened and/or toothed to contribute to the friction needed to overcome the applied working load on the rope.

In order to release the rope from conventional gripping means such as cams, it is usually necessary to pull the unloaded or free end of the rope out of the gripping means in a direction which is substantially perpendicular to the line of the rope thereby dragging the rope across the surface of the gripping means. The amount of pulling force needs to be sufficient to overcome the friction between the gripping means and the rope, and is therefore relatively high as a proportion of the working load on the rope. This makes it difficult to release rope particularly when the applied working load on the rope is significantly greater than the available pulling force required to release the rope. On many conventional cleats, the available pulling force is limited by human hand grip and strength so that it can often be especially difficult, if not impossible, to release rope. Also, when the rope is dragged across the surface of the gripping means, the shearing forces between the rope surface and gripping means can cause serious damage to the rope particularly if the gripping means surface is roughened and/or toothed.

SUMMARY OF THE INVENTION

According to the present invention, there is provided a housing that is typically but not necessarily configured with a base and two sides through which rope or tape is allowed to pass. One end of the rope can be attached to a fluctuating or static applied load, and the housing is secured relative to the rope such that the housing is constrained not to move in the same direction as the applied load on the rope. A lever that is pivoted from the housing on an axis which is perpendicular to a line along the length of the rope, and which is parallel to the plane of the base of the housing such that rotational movement of the lever may be determined by movement of the rope passing through and extending from the end of the housing, the end being the end which is furthest along the length of the rope from the source of the applied load. A substantially conventional gripping member, such as a cam, is pivoted about an axis parallel to and positioned apart from the axis of rotation of the lever. The gripping member axis is able to move within a path constrained either towards or away from the rope, and the lever and gripping member axis is arranged such that the extent of rotational movement of the lever in opposite radial directions determines movement of the gripping member axis in two configurations in which the first configuration urges the gripping member axis and the gripping member towards the surface of the rope such that the gripping member compresses the rope against the base of the housing and grips the rope, and in which the second configuration allows the gripping member axis and the gripping member to move away from the rope thereby releasing the rope. The geometric and mechanical relationship between the lever and the gripping member axis is arranged such that the force needed to be applied at the lever by movement of the rope to move from the first configuration to the second configuration is small relative in the applied load on the rope, and the force needed to be applied at the lever by movement of the rope to move from the second configuration to the first configuration is also small.

Some embodiments of the housing may have only one side and further embodiments of the housing may have a top structure. While in typical embodiments, rope is compressed against the housing base, in some embodiments the housing may not have a base such that the rope is compressed against another component which is typically attached to the housing. In many embodiments, the cam and housing base may have a toothed (serrated) surface to assist in gripping the rope, and the cam may be urged by a light spring towards the rope. The cam as a gripping member is preferred in order to allow the invention to be used with a range of rope cross-sectional sizes. However, the invention could be configured to operate with any other suitable substantially conventional gripping means. Embodiments intended specifically for use with tape may use such other substantially conventional gripping means.

While a particular feature of the invention is its ability to allow easy release of loaded rope by operating the rope itself close to or at a distance from the invention, the invention may also be operated by other means such as by direct manual control of the lever to release and grip rope.

BRIEF DESCRIPTION OF THE DRAWINGS

Some embodiments of the invention will now be described by way of example with reference to the accompanying drawings, in which.

DETAILED DESCRIPTION OF THE INVENTION

As shown in FIGS. 1 to 12, a cleat has housing 3 through which rope 1 can pass. One end of rope 1 can be subjected to fluctuating or static loads in the direction of arrow 2. Housing 3 is secured such that it is constrained not to move in the direction of arrow 2. First lever 4 is pivoted in housing 3 about first pivot 5. Gripping member 6 is shown as a conventional cam that is pivoted about second pivot 7. The surface of cam (gripping member) 6 that is in contact with rope 1 may be toothed 31 (i.e., serrated) to assist in gripping rope 1, as shown by way of example in FIGS. 5 and 6. Stop 8 is an optional abutment, which limits the extent of rotation of the gripping member in one direction.

Figure 1:
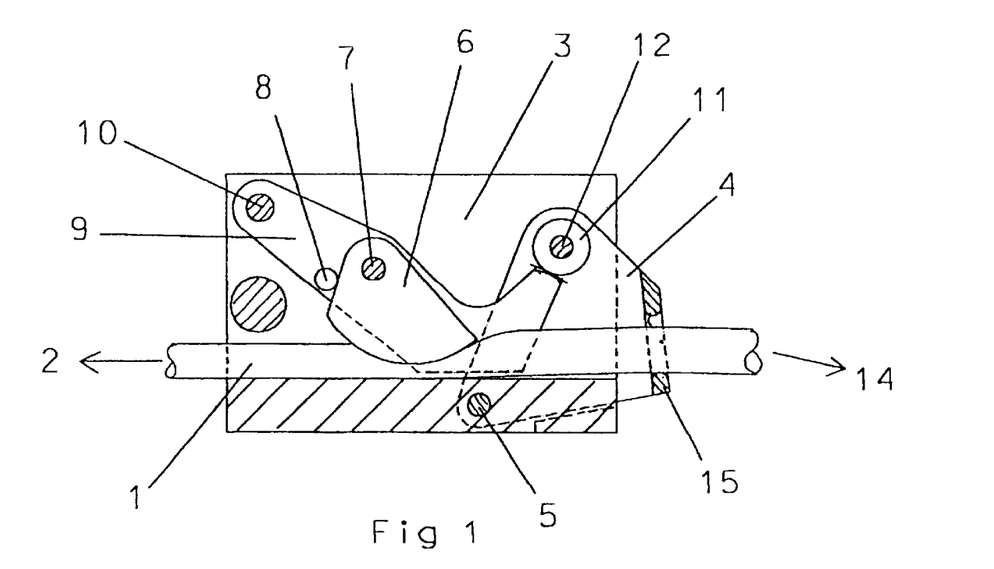
FIG. 1 is a sectional side elevation view of an arrangement for constraining the path of movement of the gripping component using a second lever, shown in the first configuration.
Figure 10:
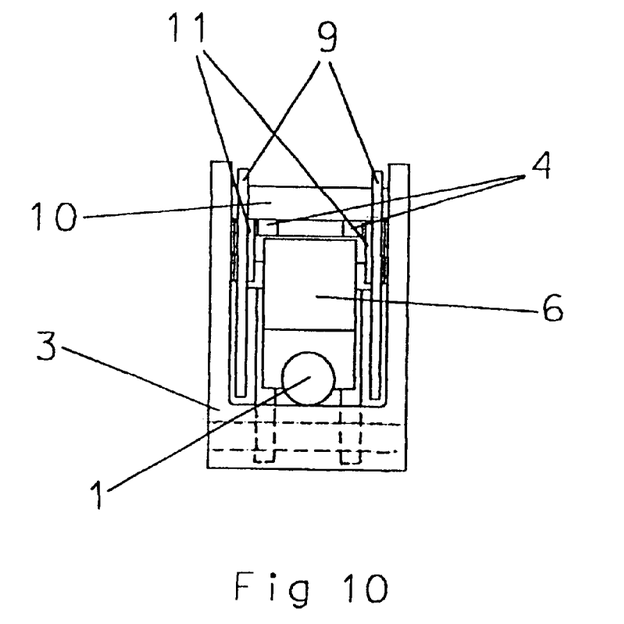
FIG. 10 is an end view of FIG. 1.

In FIGS. 1 and 10, second pivot 7 of cam 6 is attached to second lever 9 to form a gripping component including cam 6, second lever 9 and pivot 7. Second lever 9 is pivoted from housing 3 about third pivot 10. Abutment 11 is shown as a roller that can rotate about fourth pivot 12 which is attached to first lever 4. Abutment 11 could also be a low friction material that is fixed to or is part of first lever 4. Abutment roller 11 bears on second lever 9 such that it constrains rotational movement of second lever 9 in a counter-clockwise direction relative to FIG. 1 away from rope 1. When a load is applied to rope 1 in the direction of arrow 2, the friction between gripping member 6 and rope 1 urges gripping member 6 to rotate such that it compresses rope 1 against the base of housing 3. The normal force applied to rope 1 by gripping member 6 together with the coefficient of friction between the surface of rope 1 and both the respective surfaces of gripping member 6 and the base of housing 3 provides sufficient friction to resist the applied load on rope 1.

Figure 2:
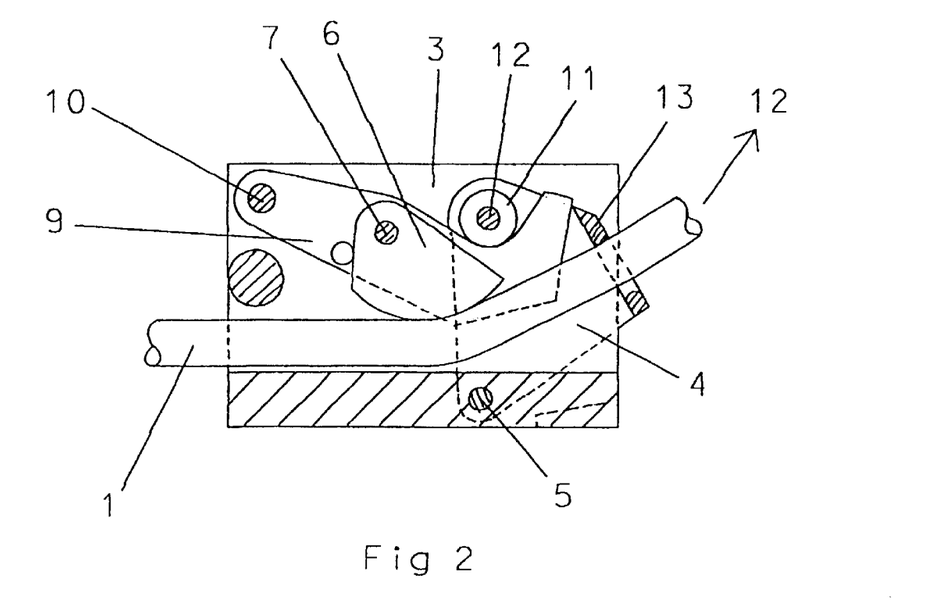
FIG. 2 is a sectional side elevation view of the arrangement in FIG. 1, shown in the second configuration.

In order to release rope 1 from being gripped in FIG. 1, the part of rope 1 which emerges from housing 3 through first lever 4 is pulled upwards in a direction shown typically by arrow 12 in FIG. 2. Rope 1 bears on first abutment side 13 which is attached to first lever 4 thereby urging first lever 4 to rotate away from rope 1 (or the base of housing 3) about first pivot 5 in a counter-clockwise direction relative to FIG. 1. A force applied directly to first lever 4 such as by manual operation could also determine rotation of first lever 4. Abutment roller 11 moves away from second lever 9 allowing second lever 9 to rotate in a counter-clockwise direction relative to FIG. 1. Gripping member (cam) 6 moves with second lever 9 away from rope 1 thereby releasing its grip on rope 1 as shown in FIG. 2.

The force applied by gripping member 6 on rope 1 to resist the applied load on the rope is transmitted through second lever 9 and resisted by a force between abutment roller 11 on first lever 4 and first pivot 5. However, at the start of rotation of first lever 4, the surface of second lever 9 bearing on abutment roller 11 is substantially perpendicular to the direction of the resisting force between abutment roller 11 and first pivot 5 such that the torque required to rotate first lever 4 about first pivot 5 is small in relation to the applied load on rope 1. The extent of rotation of first lever 4, as shown in FIG. 2 is determined by the profile of second lever 9 which is acted on by abutment roller 11. Thus in FIG. 2, the cleat is shown in the second configuration.

In order to return to gripping the rope, in the first configuration as shown in FIG. 1, rope 1 is moved in a direction as indicated by arrow 14 such that the rope acts on second abutment side 15. Second abutment side 15 is attached to or is part of first lever 4. Abutment roller 11 contacts and rolls on a surface profile of second lever 9, and the profile is carefully determined so that when first lever 4 is rotated to an extent in a clockwise direction relative to FIG. 2, second lever 9 is constrained to rotate easily such that second pivot 7 and gripping member 6 move with comparatively little resistance towards the rope to grip the rope as shown in FIG. 1.

Figure 3:
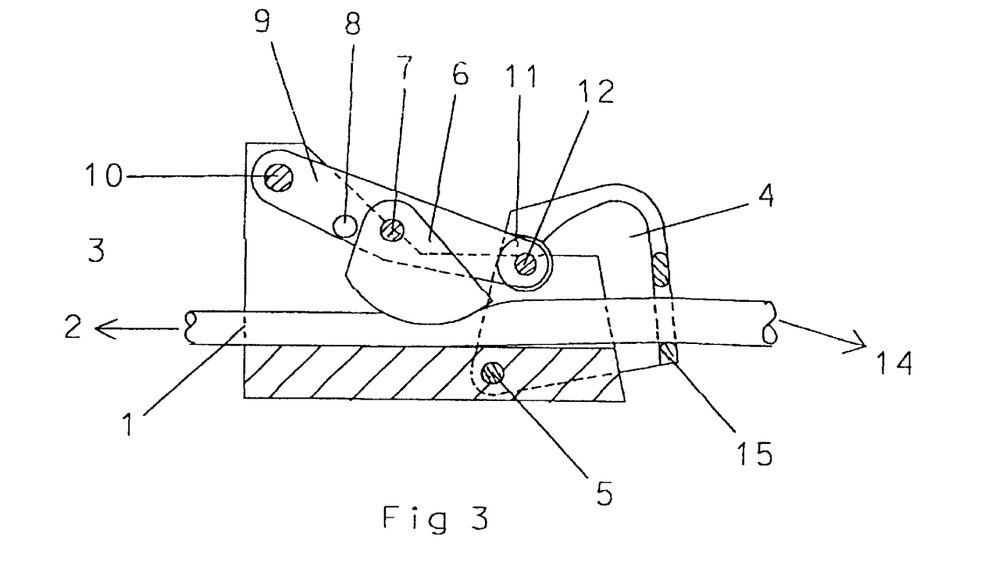
FIG. 3 is a sectional side elevation view of an alternative arrangement for constraining the path of movement of the gripping component using a second lever, shown in the first configuration.
Figure 4:
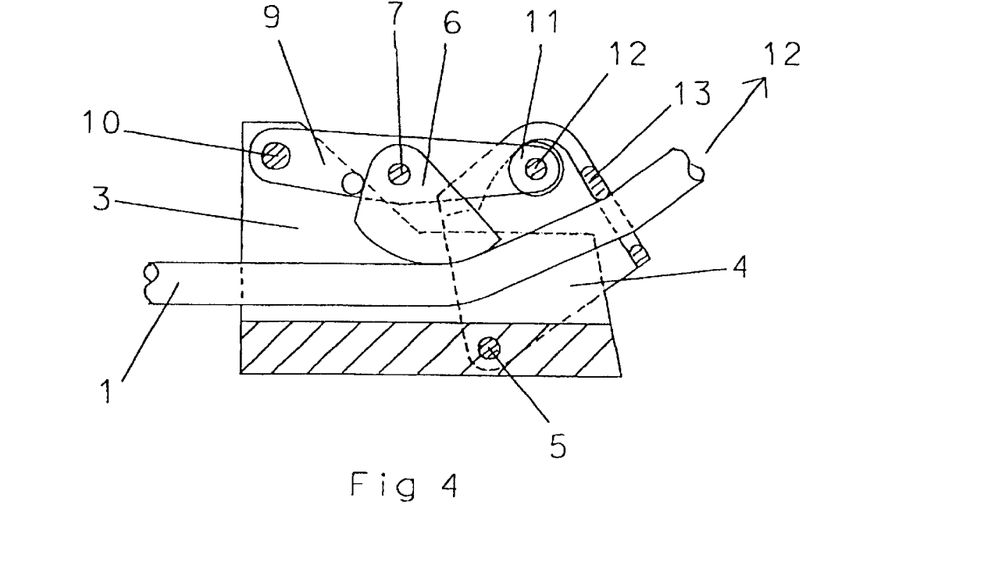
FIG. 4 is a sectional side elevation view of the arrangement in FIG. 3, shown in the second configuration.
Figure 11:
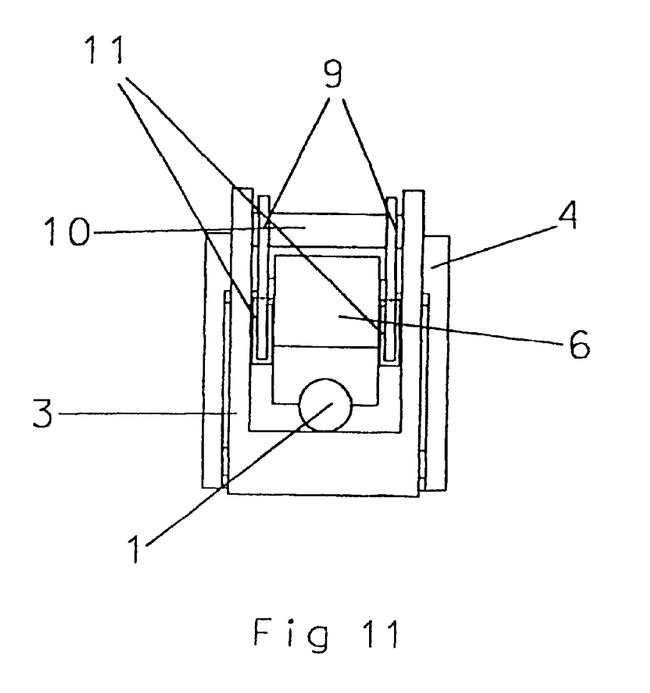
FIG. 11 is an end view of FIG. 3.

FIGS. 3, 4 and 11 show an embodiment in which abutment roller 11 is attached to lever 9. In FIG. 3, lever 4 bears on abutment roller 11 constraining rotational movement of lever 9 away from rope 1 such that cam 6 engages and grips rope 1. Rope 1 is pulled in the direction of arrow 12 thereby rotating lever 4 and allowing lever 9 to rotate away from rope 1 (or base of housing 3) as shown in FIG. 4, and releasing cam 6 from gripping the rope 1. The surface of lever 4 bearing on abutment roller 11 is substantially perpendicular to the direction of the resisting force between said surface and pivot 5 such that the torque required to rotate lever 4 about pivot 5 is small in relation to the applied load on rope 1. The extent of rotation of lever 4, as shown in FIG. 4, is determined by the profile of lever 4 constraining the path of movement of abutment roller 11.

Figure 5:
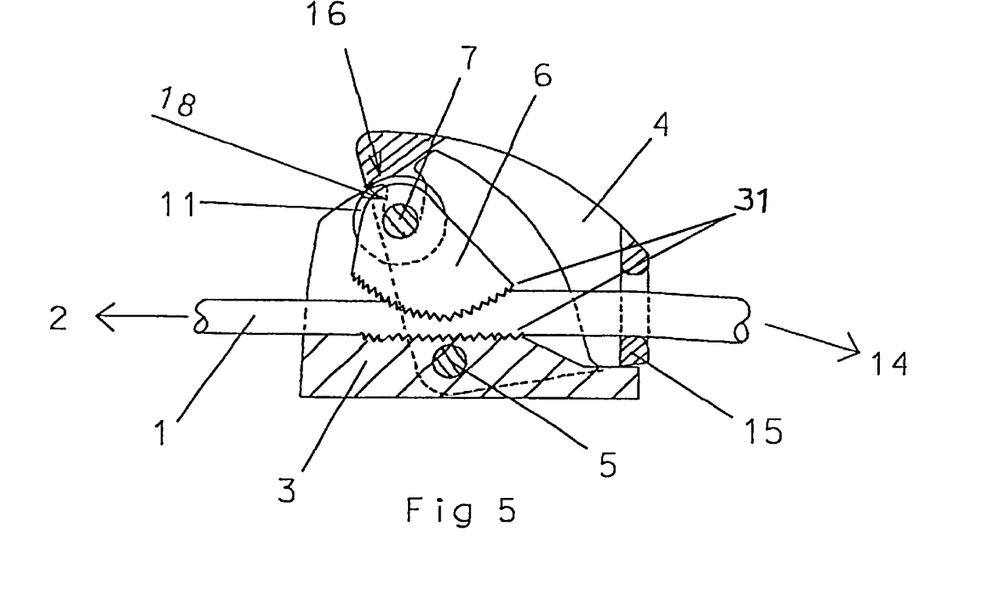
FIG. 5 is a sectional side elevation view of an arrangement whereby the gripping component axis path of movement is constrained by the housing, shown in the first configuration.
Figure 6:
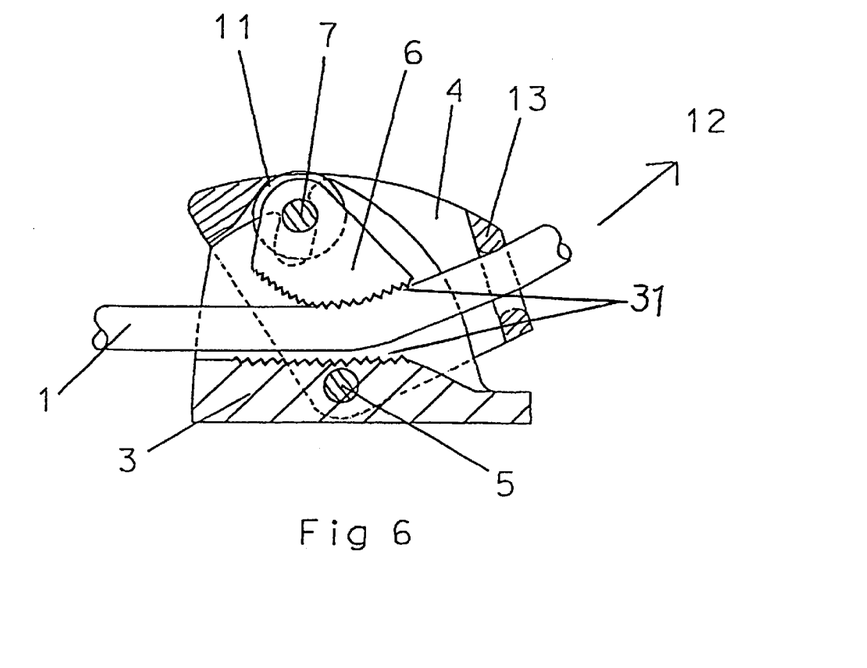
FIG. 6 is a sectional side elevation view of the arrangement in FIG. 5, shown in the second configuration.
Figure 12:
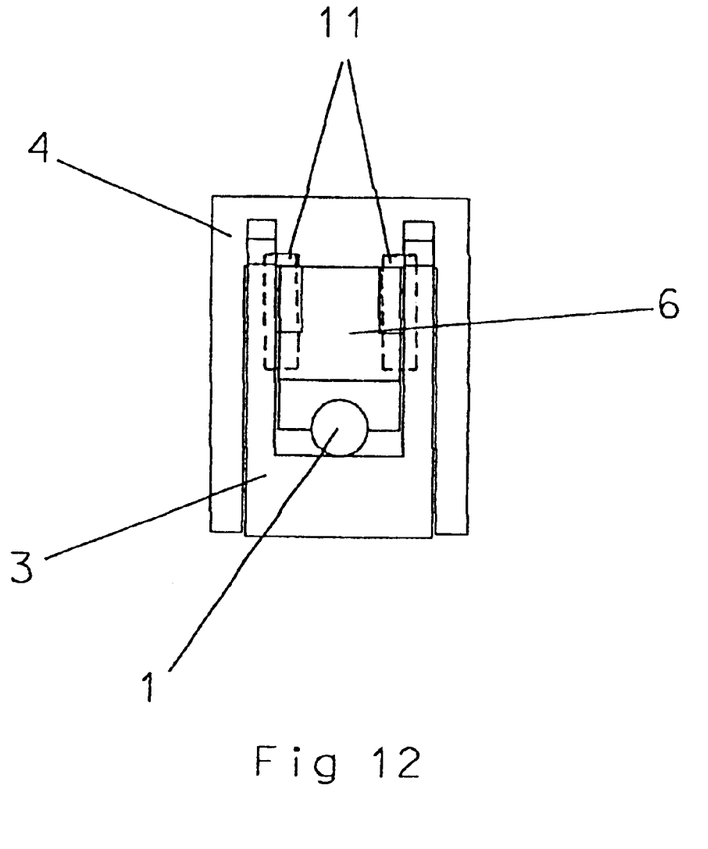
FIG. 12 is an end view of FIG. 5.

FIGS. 5, 6 and 12 show an embodiment of the invention whereby both cam 6 and its axis of rotation about pivot 7 are constrained to move within a path defined by slot 18 which is typically a feature within housing 3. In FIG. 5, surface 16 is a part of lever 4 and bears on abutment roller 11. Abutment roller 11 is typically attached to pivot 7 of cam 6 and is able to rotate about pivot 7. Thus, second lever 9 is unnecessary, so the gripping component includes cam 6 and pivot 7. When a load is applied to rope 1 in the direction of arrow 2, cam 6 is constrained by lever 4 at surface 16 such that it cannot move away from rope 1 and therefore engages and grips rope 1. In order to release the gripped rope 1, the rope is pulled in a direction approximately as indicated by arrow 12 such that it bears on abutment side 13 which is part of lever 4. Lever 4 rotates in a counter-clockwise direction relative to FIG. 6 such that cam 6, pivot 7 and abutment roller 11 move away from rope 1 (i.e., base of housing 3) in a direction defined by slot 18 in housing 3 thereby releasing rope 1 in the second configuration. In order to grip the released rope, in the first configuration, rope 1 is pulled in a direction approximately as indicated by arrow 14 such that rope 1 bears on abutment side 15 on lever 4 urging lever 4 to rotate in a clockwise direction relative to FIG. 6 such that abutment roller 11 is constrained by surface 16 on lever 4. A force applied directly to lever 4 such as by manual operation could also be used to rotate lever 4. Surface 16 on lever 4 is substantially perpendicular to the direction of the resisting load between surface 16 and pivot 5 such that the torque required to rotate lever 4 about pivot 5 is small in relation to the applied load on rope 1.

Figure 7:
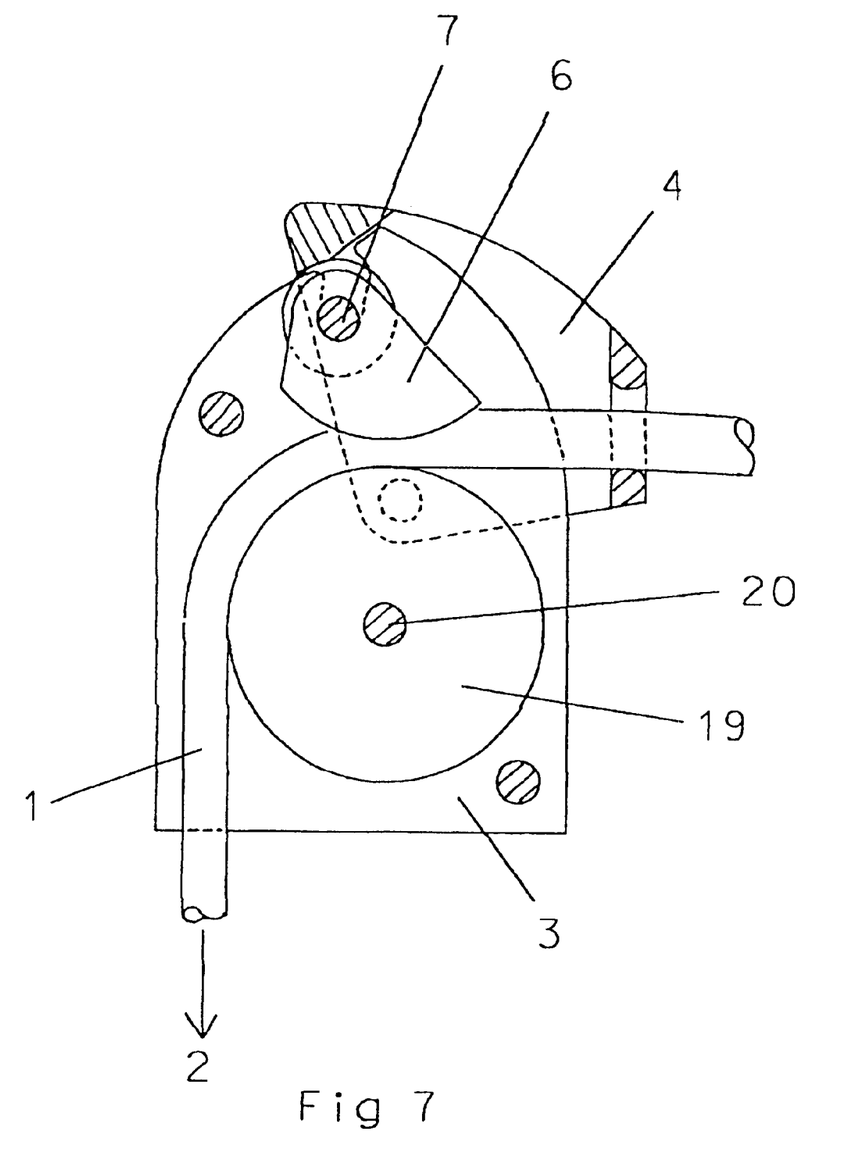
FIG. 7 is a view showing an embodiment of the invention whereby the rope is gripped against a pulley wheel.

FIG. 7 shows an application of the invention whereby rope 1 is compressed between cam 6 and pulley wheel 19. Pulley wheel 19 is attached to housing 3, and the pulley wheel 19 forms the base of housing 3.

Figure 8:
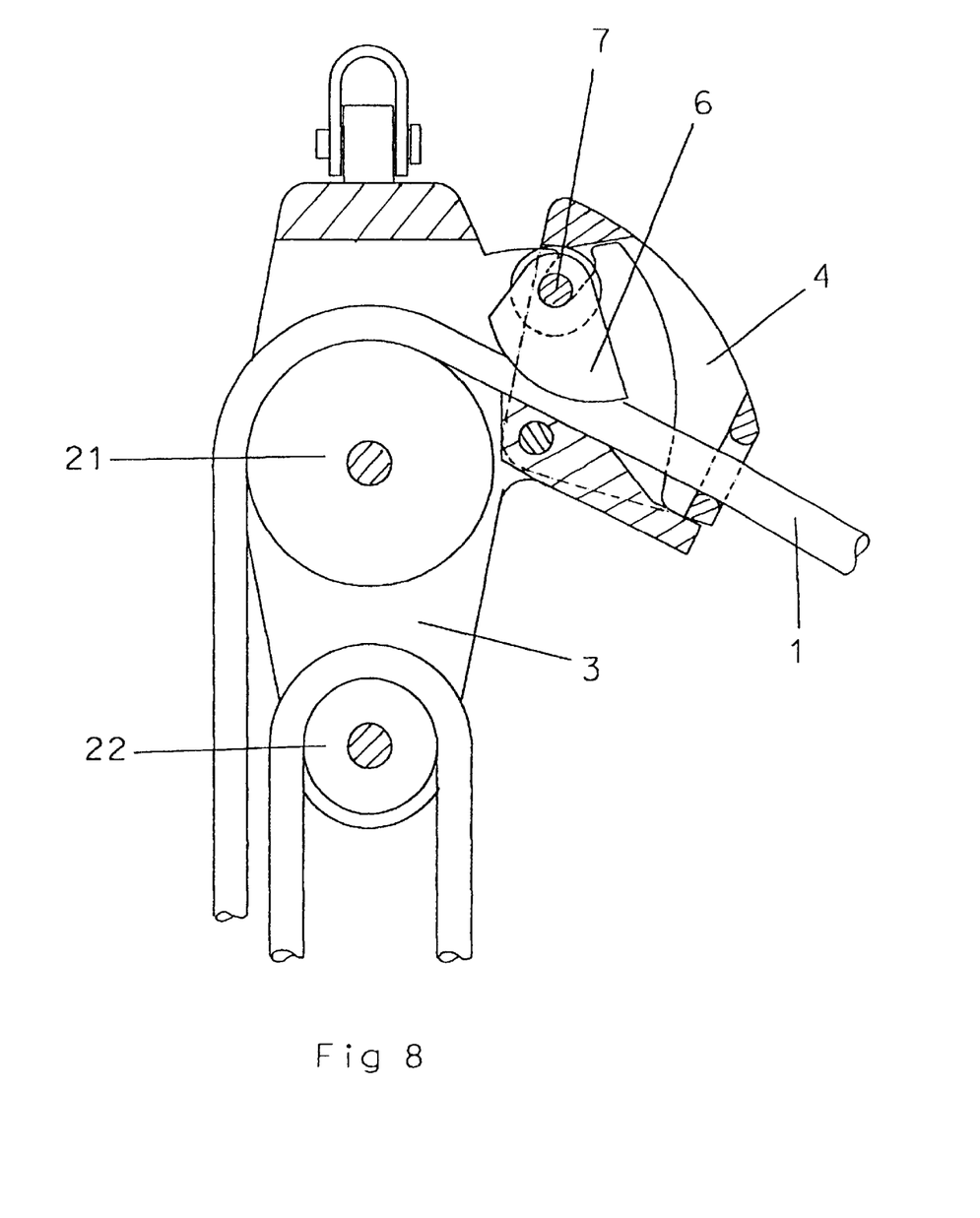
FIG. 8 is a view showing an embodiment of the invention incorporated into a conventional pulley block.

FIG. 8 shows an application of the invention whereby the invention is incorporated into a substantially conventional pulley block. In other words, housing 3 comprises a pulley block, and housing 3 is also the housing to which pulley wheels 21 and 22 are attached.

Figure 9:
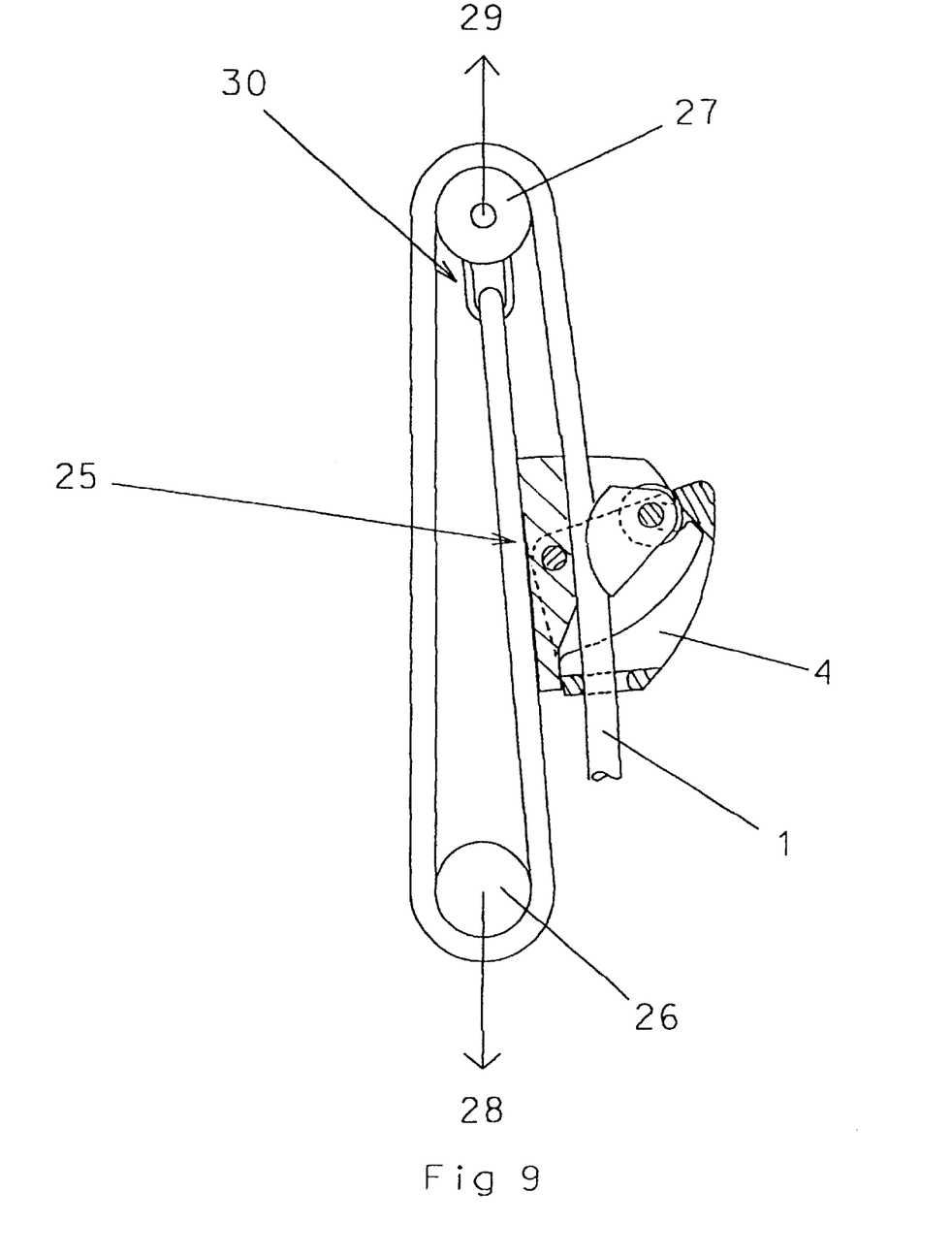
FIG. 9 is a view showing an embodiment of the invention applied to a typical securing system based on rope or tape.

FIG. 9 shows a further application of the invention whereby housing 3 is fixed to rope 1 typically as shown by arrow 25, although attachment could be by any conventional means. Two pulley wheels 26 and 27 respectively are attached to points between which a load is applied typically as indicated by arrows 28 and 29 respectively. One end of rope 1 is attached to pulley wheel 27. The other end of rope 1 is gripped and released by the invention.

In FIGS. 1 to 12 the degree of ease of releasing the loaded rope is determined typically by the angle between the surface on which roller 11 bears and a line from such surface to pivot 5 on lever 4 as well as the frictional resistance of moving abutment roller 11 relative to such surface and the frictional resistance of rotating lever 4 about pivot 5.

Typically, the angle is substantially close to or at ninety degrees. However, if the angle is too great in one direction, the action of releasing rope 1 would be too easy such that rope 1 may be released accidentally rather than intentionally. Conversely, if the angle is too small, the action of releasing the rope would be too difficult, particularly when the releasing action needs to be undertaken at a distance from the invention through movement of rope 1 in a direction as indicated by arrow 12. Therefore, it is important that the angle is correctly determined taking into account friction at roller 11 and at pivot 5.

Also, in FIGS. 1 to 12, the degree of ease of operating lever 4 to rotate from the releasing rope configuration to the gripping rope configuration is determined substantially by the angle between the surface on which abutment roller 11 bears and a line from such surface to pivot 5 on lever 4. The operating force required on lever 4 to rotate it to the gripping position is smaller the closer that the angle is to being parallel to the line. A small such operating force is of particular benefit when such force needs to be applied at a distance from the invention through movement of rope 1 in a direction as indicated by arrow 14.

What is claimed is:

1. An apparatus for gripping a flexible elongated member, the apparatus comprising:
    a housing including a base portion, said base portion having an engagement surface extending in a longitudinal direction for receiving therealong the elongated member;
    a lever pivotally connected to said housing by a first pivot, and having a first contact surface; and
    a gripping component including a gripping member operable to pivot about a second pivot, said second pivot being operable to move relative to said housing, said gripping component being operable to move relative to said housing and having a second contact surface for engaging said first contact surface of said lever;
    wherein said lever has an opening for allowing the elongated member to pass therethrough such that said lever is operable to move relative to said housing between a first position, whereat said first contact surface engages said second contact surface such that said gripping component is close to said engagement surface of said base portion and is prevented from moving away from said engagement surface so as to grip the elongated member, and a second position, whereat said first contact surface engages said second contact surface such that said gripping component is away from said engagement surface of said base portion so as to release the elongated member, by manipulation of the elongated member; and
    wherein one of said first contact surface and said second contact surface comprises a roller surface of a roller mounted on one of said lever and said gripping component, respectively, the other of said first contact surface and said second contact surface including a first portion for engaging said roller surface when said lever is in said first position so as to grip the elongated member and including a second portion for engaging said roller surface when said lever is in said second position so as to release the elongated member.

2. The apparatus of claim 1, wherein said first portion and said second portion are not co-planar.

3. The apparatus of claim 1, wherein an axis of said first pivot is transverse to the longitudinal direction of said engagement surface.

4. The apparatus of claim 1, wherein said lever comprises a first lever, said gripping component further including a second lever pivotally connected to said housing by a third pivot, said gripping member being pivotally connected to said second lever at a point between said third pivot and said first contact surface.

5. The apparatus of claim 1, wherein a portion of said gripping member for contacting the elongated member is serrated and said engagement surface is serrated.

6. The apparatus of claim 1, wherein said base portion of said housing comprises a pulley wheel.

7. The apparatus of claim 1, wherein said gripping component, said housing, and said lever are arranged such that when said lever is in said first position, a line tangential to a point of contact between said first contact surface and said second contact surface forms an angle with a line extending through said first pivot and the point of contact between said first contact surface and said second contact surface, said angle determining an amount of force necessary to move said lever to said second position so as to release the elongated member.

8. The apparatus of claim 7, wherein said angle is subtantially equal to 90°.

9. The apparatus of claim 1, wherein said gripping component further includes a shaft and a roller supported by said shaft, said roller having said second contact surface thereon, said gripping member being pivotally mounted on said shaft, said shaft having an axis trasverse to a longitudinal direction of said housing, said housing having a slot formed therein for guiding a movement of said shaft as said lever moves between said first position and said second position.

10. The apparatus of claim 9, wherein said first contact surface of said lever comprises a cam surface for engaging said second contact surface of said roller so as to move said shaft within said slot of said housing, thereby moving said gripping member toward and away from said engagement surface of said base portion.

11. The apparatus of claim 1, further comprising an abutment component for preventing said lever from pivoting beyond said first position and said second position.

12. The apparatus of claim 11, wherein said abutment component comprises a first abutment side of said lever and a second abutment side of said lever.

13. The apparatus of claim 1, wherein said lever comprises two V-shaped side panels having free ends joined by end panels.

14. The apparatus of claim 13, wherein said opening is formed in one of said end panels such that a bottom of said opening is aligned with said engagement surface of said base portion when said lever is in said first position.

15. The apparatus of claim 1, wherein said housing further includes two spaced walls positioned on either side of said base portion, said gripping component being mounted between said spaced side walls.

16. The apparatus of claim 5, wherein said housing further includes an end wall formed between said spaced side walls, said end wall having an aperture adjacent to said base portion for receiving the elongated member.

17. An apparatus for gripping a flexible elongated member, the apparatus comprising:

a housing including a base portion, said base portion having an engagement surface extending in a longitudinal direction for receiving therealong the elongated member;

a lever pivotally connected to said housing by a first pivot, and having a first contact surface, an axis of said first pivot being transverse to the longitudinal direction of said engagement surface; and a gripping component including a gripping member operable to pivot about a second pivot, said second pivot being operable to move relative to said housing, said gripping component being operable to move relative to said housing and having a second contact surface for engaging said first contact surface of said lever;

wherein said lever has an opening for allowing the elongated member to pass therethrough such that said lever is operable to move relative to said housing between a first position, whereat said first contact surface engages said second contact surface such that said gripping component is close to said engagement surface of said base portion and is prevented from moving away from said engagement surface so as to grip the elongated member, and a second position, whereat said first contact surface engages said second contact surface such that said gripping component is away from said engagement surface of said base portion so as to release the elongated member, by manipulation of the elongated member.

* * * * *